United States Patent
Carney et al.

(10) Patent No.: US 9,615,061 B2
(45) Date of Patent: Apr. 4, 2017

(54) SYSTEM AND METHOD FOR CREATING AND PRESENTING COMPOSITE VIDEO-ON-DEMAND CONTENT

(75) Inventors: John Carney, Corte Madera, CA (US); Greg Thomson, Mill Valley, CA (US); David de Andrade, San Anselmo, CA (US); Matt Marenghi, San Francisco, CA (US); Samuel Moreau, Mill Valley, CA (US); Elliot Poger, San Francisco, CA (US)

(73) Assignee: TVWorks, LLC, Philadelphia, PA (US)

( * ) Notice: Subject to any disclaimer, the term of this patent is extended or adjusted under 35 U.S.C. 154(b) by 1786 days.

(21) Appl. No.: 10/727,793

(22) Filed: Dec. 3, 2003

(65) Prior Publication Data

US 2005/0010953 A1  Jan. 13, 2005

Related U.S. Application Data (60) Provisional application No. 60/486,569, filed on Jul. 11, 2003.

(51) Int. Cl.

| | | |
|---|---|---|
| *H04N 7/173* | (2011.01) | |
| *H04N 5/445* | (2011.01) | |
| *H04N 21/2387* | (2011.01) | |
| *H04N 21/2668* | (2011.01) | |
| *H04N 21/433* | (2011.01) | |

(Continued)

(52) U.S. Cl.
CPC ..... *H04N 7/17336* (2013.01); *H04N 5/44543* (2013.01); *H04N 21/2387* (2013.01); *H04N 21/2668* (2013.01); *H04N 21/4334* (2013.01); *H04N 21/47202* (2013.01);

(Continued)

(58) Field of Classification Search
USPC ........................ 725/37, 44, 45, 47
See application file for complete search history.

(56) References Cited

U.S. PATENT DOCUMENTS

| | | |
|---|---|---|
| 5,287,489 A | 2/1994 | Nimmo et al. |
| 5,583,563 A | 12/1996 | Wanderscheid et al. |

(Continued)

FOREIGN PATENT DOCUMENTS

| | | |
|---|---|---|
| WO | 00/11869 | 3/2000 |
| WO | 01/82613 | 11/2001 |

(Continued)

OTHER PUBLICATIONS

Shim, Simon S. Y., et al. "A SMIL Based Graphical Interface for Interactive TV", Internet Tech. Laboratory Dept. of Comp. Engineering, San Jose State University pp. 257-266.

(Continued)

*Primary Examiner* — John Schnurr
(74) *Attorney, Agent, or Firm* — Banner & Witcoff, Ltd.

(57) ABSTRACT

Embodiments of the invention provide systems and methods for the dynamic creation and presentation of user-specified VOD content consisting of multiple VOD clips as a passive viewing experience. For one embodiment, a user selects a set of VOD clips from a list or other selection presentation and the selected VOD clips are presented back-to-back. For one embodiment of the invention, the user may reorder the presentation sequence of the selected VOD clips. Embodiments of the invention thereby allow a user to dynamically create and present a user-specific, passive viewing presentation.

3 Claims, 8 Drawing Sheets

(51) Int. Cl.
H04N 21/472 (2011.01)
H04N 21/482 (2011.01)
H04N 21/658 (2011.01)

(52) U.S. Cl.
CPC ..... *H04N 21/47214* (2013.01); *H04N 21/482* (2013.01); *H04N 21/6581* (2013.01)

(56) References Cited

U.S. PATENT DOCUMENTS

| | | | |
|---|---|---|---|
| 5,613,057 | A | 3/1997 | Caravel |
| 5,659,793 | A | 8/1997 | Escobar et al. |
| 5,751,953 | A * | 5/1998 | Shiels et al. ............... 715/720 |
| 5,826,102 | A | 10/1998 | Escobar et al. |
| 5,852,435 | A | 12/1998 | Vigneaux et al. |
| 5,860,073 | A | 1/1999 | Ferrel et al. |
| 5,892,905 | A | 4/1999 | Brandt et al. |
| 5,996,025 | A | 11/1999 | Day et al. |
| 6,008,836 | A | 12/1999 | Bruck et al. |
| 6,088,722 | A | 7/2000 | Herz et al. |
| 6,240,555 | B1 | 5/2001 | Shoff et al. |
| 6,292,827 | B1 | 9/2001 | Raz |
| 6,314,569 | B1 | 11/2001 | Chernock et al. |
| 6,317,885 | B1 | 11/2001 | Fries |
| 6,345,305 | B1 | 2/2002 | Beck et al. |
| 6,415,438 | B1 | 7/2002 | Blackketter et al. |
| 6,522,342 | B1 | 2/2003 | Gagnon et al. |
| 6,525,580 | B2 * | 2/2003 | Singor ............... 327/172 |
| 6,529,950 | B1 | 3/2003 | Lumelsky et al. |
| 6,564,263 | B1 | 5/2003 | Bergman et al. |
| 6,571,392 | B1 | 5/2003 | Zigmond et al. |
| 6,760,043 | B2 | 7/2004 | Markel |
| 6,760,916 | B2 * | 7/2004 | Holtz et al. ............... 725/34 |
| 6,961,954 | B1 | 11/2005 | Maybury et al. |
| 6,986,154 | B1 | 1/2006 | Price et al. |
| 7,028,327 | B1 * | 4/2006 | Dougherty et al. ............ 725/93 |
| 7,114,170 | B2 | 9/2006 | Harris et al. |
| 7,162,697 | B2 | 1/2007 | Markel |
| 7,197,758 | B1 * | 3/2007 | Blackketter et al. ............ 725/37 |
| 7,207,057 | B1 | 4/2007 | Rowe |
| 7,363,612 | B2 | 4/2008 | Satuloori et al. |
| 7,516,468 | B1 | 4/2009 | Deller et al. |
| 2002/0056095 | A1 | 5/2002 | Uehara et al. |
| 2002/0059586 | A1 | 5/2002 | Carney et al. |
| 2002/0059629 | A1 | 5/2002 | Markel |
| 2002/0078444 | A1 | 6/2002 | Krewin et al. |
| 2002/0087981 | A1 * | 7/2002 | Daniels ............... 725/38 |
| 2002/0108122 | A1 | 8/2002 | Alao et al. |
| 2002/0144273 | A1 | 10/2002 | Reto |
| 2002/0162120 | A1 * | 10/2002 | Mitchell ............... 725/135 |
| 2002/0169885 | A1 | 11/2002 | Alao et al. |
| 2003/0009485 | A1 * | 1/2003 | Turner ............... 707/200 |
| 2003/0014753 | A1 | 1/2003 | Beach et al. |
| 2003/0018966 | A1 * | 1/2003 | Cook et al. ............... 725/2 |
| 2003/0028873 | A1 | 2/2003 | Lemmons |
| 2003/0028889 | A1 | 2/2003 | McCoskey et al. |
| 2003/0030752 | A1 * | 2/2003 | Begeja et al. ............... 348/563 |
| 2003/0070170 | A1 | 4/2003 | Lennon |
| 2003/0093790 | A1 * | 5/2003 | Logan et al. ............... 725/38 |
| 2003/0093794 | A1 | 5/2003 | Thomas et al. |
| 2003/0101230 | A1 * | 5/2003 | Benschoter et al. ............ 709/217 |
| 2003/0163815 | A1 | 8/2003 | Begeja et al. |
| 2003/0204854 | A1 | 10/2003 | Blackketter et al. |
| 2004/0025180 | A1 | 2/2004 | Begeja et al. |
| 2004/0117831 | A1 | 6/2004 | Ellis et al. |
| 2004/0221308 | A1 | 11/2004 | Cuttner et al. |
| 2004/0268400 | A1 * | 12/2004 | Barde et al. ............... 725/94 |
| 2005/0005308 | A1 * | 1/2005 | Logan et al. ............... 725/135 |
| 2005/0204386 | A1 | 9/2005 | Ismail et al. |
| 2005/0246732 | A1 | 11/2005 | Dudkiewicz et al. |
| 2006/0031882 | A1 | 2/2006 | Swix et al. |
| 2006/0095937 | A1 | 5/2006 | Knudson et al. |
| 2006/0184979 | A1 | 8/2006 | Bayrakeri et al. |
| 2007/0271587 | A1 | 11/2007 | Rowe |
| 2009/0094632 | A1 | 4/2009 | Newnam et al. |

FOREIGN PATENT DOCUMENTS

| | | |
|---|---|---|
| WO | 02/063426 | 8/2002 |
| WO | 02/063471 | 8/2002 |
| WO | 02/063851 | 8/2002 |
| WO | 02/063878 | 8/2002 |

OTHER PUBLICATIONS

Sylvain Devillers, Bitstream Syntax Definition Language: an input to MPEG-21 Content Representation, ISO, ISO/IEC JTC1/SC29/WG11 MPEG01/M7053, 15 pgs, Mar. 2001.

Fernando Pereira et al., The MPEG-4 Book, Prentice Hall, 21 pgs, Jul. 10, 2002.

Michael Adams, OpenCable Architecture, Cisco Press, 8 pgs, Dec. 3, 1999.

Mark Riehl et al., XML and Perl, 4 pgs, Oct. 16, 2002.

* cited by examiner

Fig. 9 ism and Method for Interactive VOD Program Builder/Player",
which was filed Jul. 11, 2003.

SYSTEM AND METHOD FOR CREATING AND PRESENTING COMPOSITE VIDEO-ON-DEMAND CONTENT

CLAIM OF PRIORITY

This application claims the benefit of U.S. Provisional Patent Application No. 60/486,569, entitled "System and Method for Interactive VOD Program Builder/Player", which was filed Jul. 11, 2003.

RELATED APPLICATIONS

This application is related to U.S. patent application Ser. No. 10/763,580, entitled "System and Method for Automatically Generating a Composite Video-On-Demand Content," filed on Jan. 23, 2004, and U.S. patent application Ser. No. 10/390,064, entitled "System and Method for Construction, Delivery and Display of iTV Content," filed on Mar. 14, 2003, both of which are incorporated herein by reference.

FIELD

The invention relates to presentation of video information and more specifically to systems and methods for the creation and presentation of video-on-demand (VOD) content.

BACKGROUND

Interactive television (iTV) provides a user with many additional ways of interacting with a television other than the conventional interaction of adjusting volume, changing channels, and presenting video recordings. For example, using iTV, a user can select and present video content delivered over a network. This capability, generally known as VOD programming, is currently available, in varying forms, to millions of digital cable users. VOD programming typically includes any programming that allows users to select and present video content over a network. Typically, a user may select the start time, and then further, generally has the ability to support VCR-like controls such as fast-forward, fast-rewind, and pause. Using VOD programming, users are provided with many options, such as browsing and selecting a VOD program, selecting a package of VOD programs that the user may present individually, or selecting a VOD package (e.g., a set of VOD programs), the contents of which varies over time, but that allows the user unrestricted access for the time period of the subscription.

With the current advancements in digital set top box application capabilities, cable system operators may also provide newer interfaces for the selection and playback of VOD programming. Typically, such VOD programming is generally focused on feature length programming, but recently has come to encompass shorter length programming and advertisements. Some of this shorter length programming includes small clips of VOD. However, current solutions for managing the extensive VOD content titles available to the user is limited to user selection and management of sets of 'favorites' or 'selected titles', which the user can subsequently access and wherefrom select individual titles to play. Prior art systems do not allow for the dynamic creation and presentation of user-specified VOD content consisting of multiple VOD clips as a passive viewing experience.

BRIEF DESCRIPTION OF THE DRAWINGS

The invention may be best understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Overview

Embodiments of the invention provide systems and methods for the dynamic creation and presentation of user-specified VOD content consisting of multiple VOD clips as a passive viewing experience. Throughout this application the term "VOD clip" is defined to include any individually selectable VOD program or VOD stream; any chapter or segment within a single VOD program or stream; any defined pair of start-time and stop-time codes within a single VOD program or stream; and any program recorded to a DVR, or any accessible segment of such digital video recording.

Embodiments of the invention provide a system and method by which a user can select a set of VOD clips from a list or other selection presentation and then have that set of clips play back-to-back. Throughout this application, the term "user" describes any person (e.g., user, viewer, subscriber, etc.) using an embodiment of the invention in any form on any system.

For one embodiment of the invention, the user may reorder the presentation sequence of the selected VOD clips. The invention makes use of digital set top box (STB) capabilities, such as those described in related application Ser. No. 10/390,064, filed Mar. 14, 2003, entitled "System and Method For Construction, Delivery and Display of iTV", to deliver an interactive user interface application for defining and managing a subsequent passive video experience. In this application, "STB" and "television" ("TV") may be used interchangeably, the term television being understood to provide STB-type capabilities. Embodiments of the invention thereby allow a user to dynamically create and present a user-specific, passive viewing presentation. That is, once the VOD selections have been made and the selected clips ordered, if desired, no further interaction is required of the user during presentation of the VOD content. This differs from current VOD playback schemes that provide only for the creation of canned VOD content (e.g., "favorites"), which may be presented individually.

One embodiment of the invention further allows for a set of selected clips to be recorded to a digital video recorder (DVR) as a single program, using available DVR technologies. This recording may occur during playback of the video clip set or may be directed to occur at some specific time when it can be recorded directly to disk for future viewing.

In one embodiment of the invention, the user is presented with a list of VOD clips. The items of this list are selectable such that the user can select one or more VOD clips. Upon selection of the VOD clips, the order of presentation of the VOD clips may then be set by the user. Once the set of VOD clips has been selected and ordered, the user may then present (play) the set of VOD clips as if it were a new single VOD program.

Process

Figure 1:
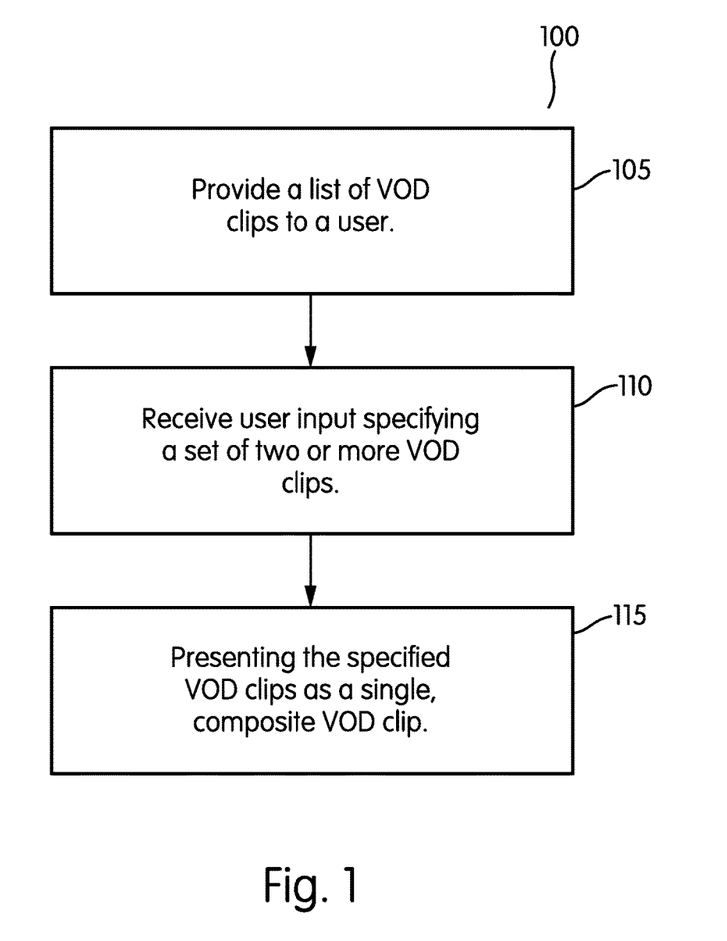
FIG. 1 illustrates a process by which a set of VOD clips are selected and presented in accordance with one embodiment of the invention.

FIG. 1 illustrates a process by which a set of VOD clips are selected and presented in accordance with one embodiment of the invention. Process 100, shown in FIG. 1, begins at operation 105 in which a list of VOD clips (e.g., VOD clip titles) is presented to the user to choose from.

Figure 2:
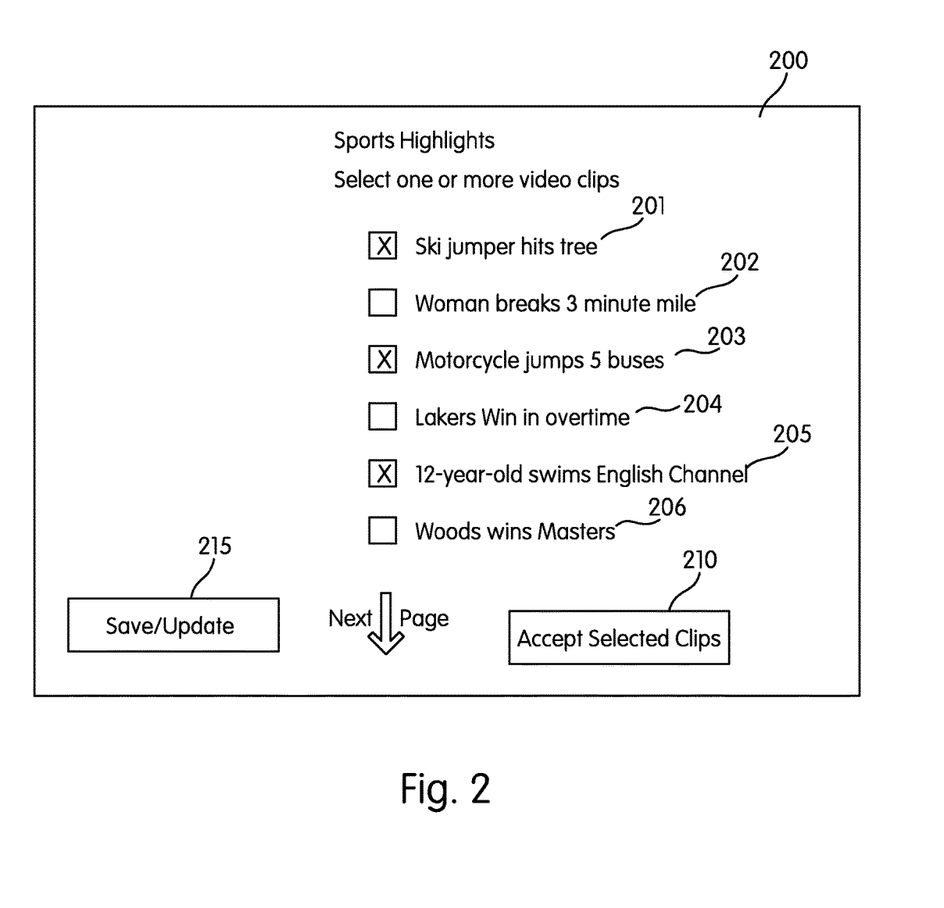
FIG. 2 illustrates the presentation and user-selection of a number of VOD clips for presentation as a composite VOD clip sequence in accordance with one embodiment of the invention.

At operation 110, the user selects desired VOD clips from among the list of VOD clips presented. FIG. 2 illustrates an example of the presentation and user selection of a number of VOD clips in accordance with one embodiment of the invention. As shown in FIG. 2, a set of VOD clips 200 entitled "Sports Highlights" is presented to the user. The set of VOD clips includes VOD clips 201-206. As indicated in FIG. 2, the user has selected VOD clips 201, 203, and 205.

At operation 115, upon direction from the user, the selected VOD clips (e.g., 201, 203, and 205) are presented as a composite VOD clip sequence, of which the selected VOD clips are component VOD clips. That is, all of the selected VOD clips, which were previously disjoint, are presented without further user-interaction, thus providing a passive viewing experience.

The user may be provided with functionality 210 to finalize selection and functionality 215 to save or update the selected VOD clip sequence. For example, saving the selection allows the user to store the composite VOD clip sequence created by the selection process for repeated presentation (e.g., presentation at a later time), and also allows the user to make modifications for a subsequent presentation. Such storage may be implemented as either a client-side data store, in volatile or non-volatile memory or hard disk, or can be stored server-side via a provided back-channel path that attaches to a server component controlling a database or other storage mechanism that will allow storing preferences specific to users and/or households.

For one embodiment of the invention, the selected VOD clips are presented in a composite fashion in the order in which they were originally provided to the user. For example, selected VOD clips 201, 203, and 205 would be presented, in that order, as a composite VOD clip sequence. In various alternative embodiments, the user may specify the order in which the selected VOD clips are presented.

Figure 3:
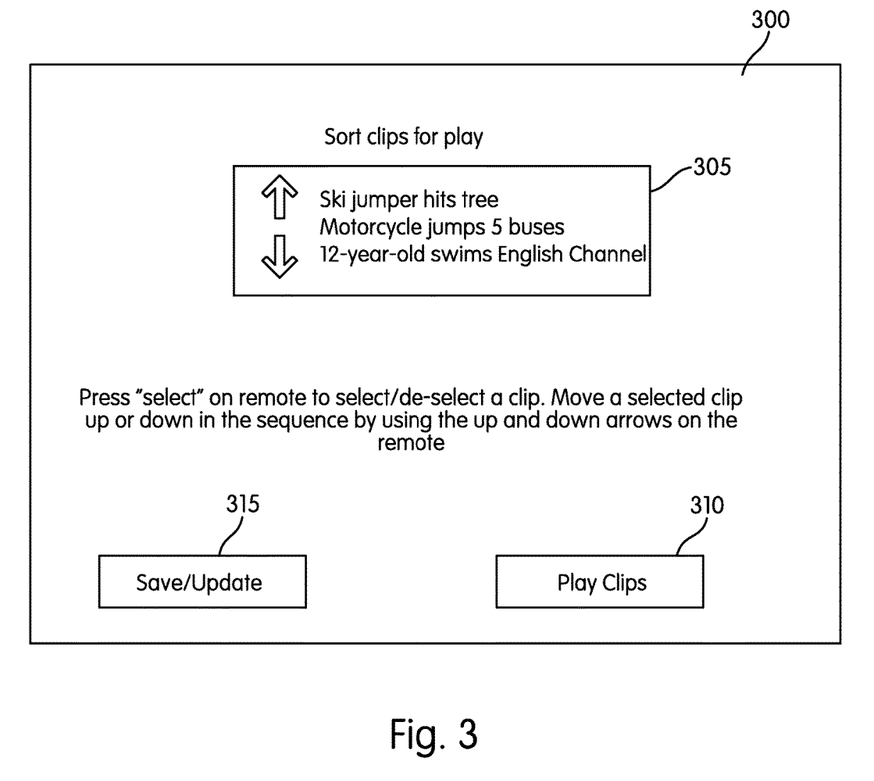
FIG. 3 illustrates the user-specified ordering of selected VOD clips for presentation as a composite VOD clip sequence in accordance with one embodiment of the invention.

FIG. 3 illustrates the user-specified ordering of selected VOD clips for presentation as a composite VOD clip sequence in accordance with one embodiment of the invention. VOD clip functionality 300, shown in FIG. 3, includes VOD clip-ordering functionality 305, that allows a user to move any of the selected VOD clips (i.e., the selected VOD clips comprising a unified VOD clip) in relation to the other selected VOD clips, thus changing the order in which the selected VOD clips are presented.

Figure 4:
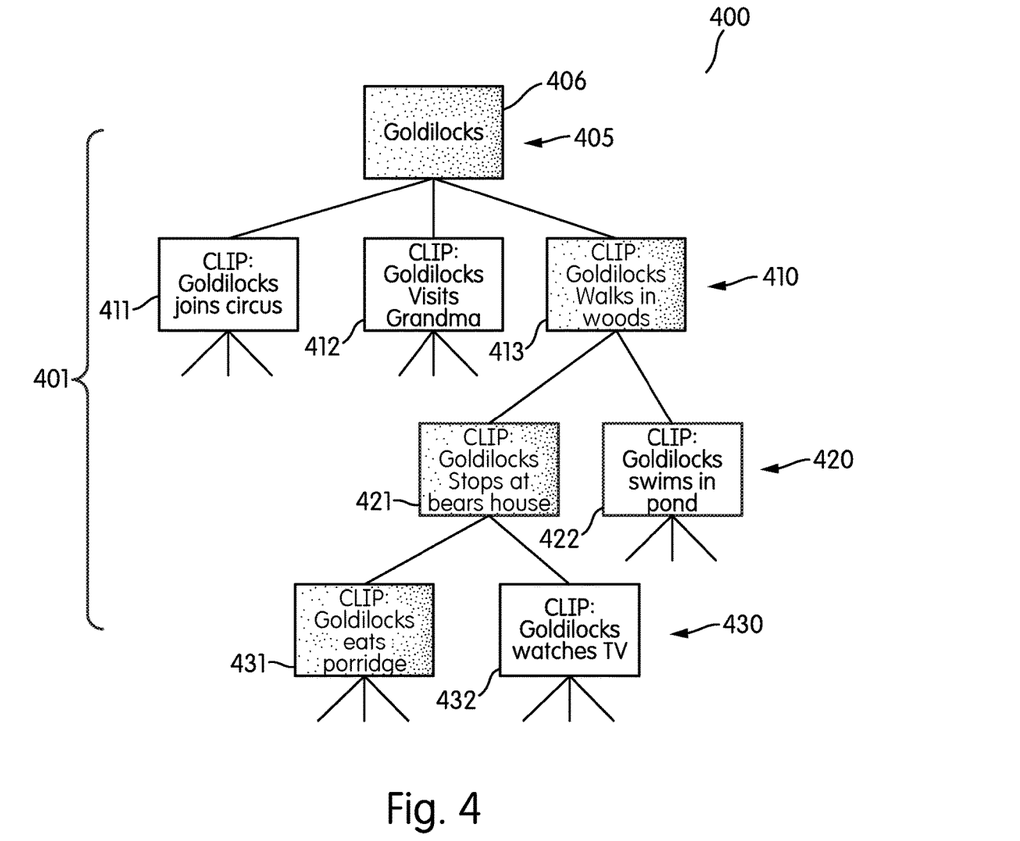
FIG. 4 illustrates the presentation and user selection of a number of VOD clips as a composite VOD clip sequence in accordance with an alternative embodiment of the invention.

FIG. 4 illustrates the presentation and user selection of a number of VOD clips in accordance with an alternative embodiment of the invention. As shown in FIG. 4, a set of VOD clips 400 is presented to the user as a decision tree 401 from which the user selects from a list of VOD clips at each node. The selection of a VOD clip at each node determines subsequent VOD clips that may be selected. That is, upon selecting a specific VOD clip at a given node, the VOD clip selected will direct the user down a specific branch of the tree to another node where additional VOD clip choices will be made. For example, decision tree 401 includes nodes 405 at which VOD clip 406 may be selected. Once VOD clip 406 has been selected, the user proceeds to node 410 where one of VOD clips 411, 412, and 413 may be selected. As shown, the user has selected VOD clip 413 thus providing the further selection of either VOD clip 421 or 422 at node 420. The user's selection of VOD clip 421 provides the further selection of VOD clips 431 and 432 at node 430. The selection process continues thusly, with the user conceptually navigating a tree of VOD clip choices.

By navigating through this tree and selecting VOD clips, the user can build up a personalized version of a story. For one such embodiment, the clips may not be further sortable, as that would remove the context of the story line based on the decision tree. After selecting the VOD clip path, the user can present (play) the resulting composite VOD clip sequence and without further interaction, enjoy their personally crafted story as a passive viewing experience.

System

Figure 5:
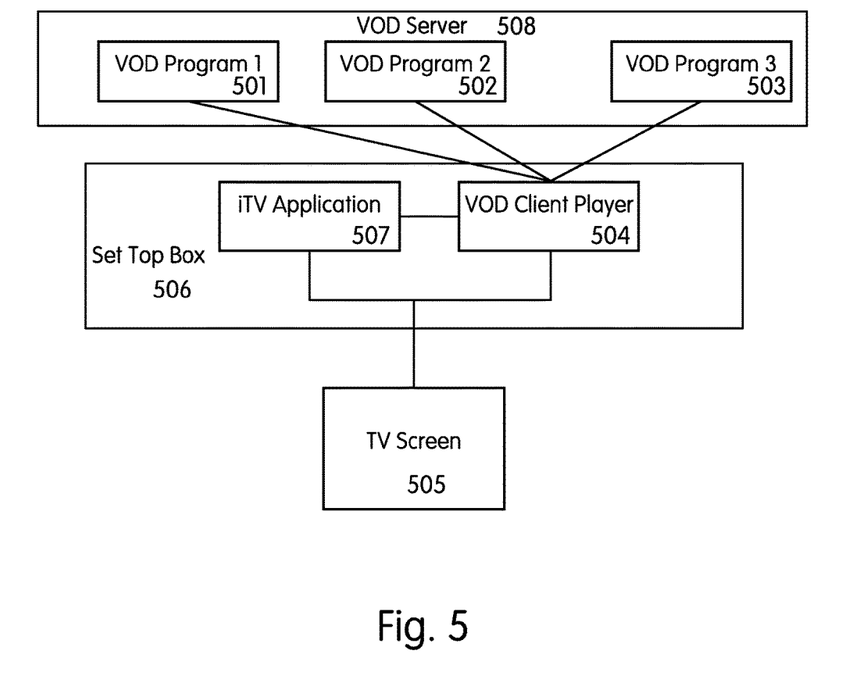
FIG. 5 illustrates a system for presenting a composite VOD clip sequence in accordance with various embodiments of the invention.

FIG. 5 illustrates a system for presenting a composite VOD clip sequence in accordance with various embodiments of the invention. System 500, shown in FIG. 5, includes an iTV Application 507 in the client STB 506 presented to the user via TV screen 505. VOD Server 508 contains VOD programs 501, 502, and 503. STB 506 contains VOD Client Player Code 504 that manages the playback requests for the various VOD clips by automatically starting and stopping the video for the different VOD clips. The VOD Client Player Code 504 will recognize the completion of a VOD clip and will automatically start playing the next VOD clip in the sequenced list of clips. In one embodiment, the VOD Client Player Code 504 will begin a new VOD session for the next clip prior to the first clip completing, such that the delay between switching clips is minimized. In either case, the Client Player Code 504 will also control behavior under fast-forward and fast-rewind by stopping and starting the appropriate clip when clip boundaries are hit during the fast-forward or fast-rewind modes. The play back method described above will be subsequently referred to as Presentation Method 1.

For an alternative embodiment, the video file may be constructed such that all clips are actually segments within the same VOD file. In this embodiment, the iTV Application 507 constructs a list of the required display path through the segments within the VOD file. For such an embodiment, there is no need for VOD Client Player Code 504 to start and stop VOD streams for different VOD assets because the assets are all within the same VOD stream file. Transitions between VOD clips are achieved by either jumping to specific chapters or by jumping to specific time codes within a single VOD asset. In either case, the VOD Client Player Code 504 will still act as the control for video playback and will jump to the right clip based on normal play, fast-forward, or fast-rewind conditions. The VOD Client Player Code 504 may be embedded within the iTV Application 507, may be a referenced component on the STB 507, as illustrated in FIG. 5, or may be a server-located function, or a combination of client and server based components that are accessed by the iTV Application 507. This method will be subsequently referred to as Presentation Method 2.

Figure 6:
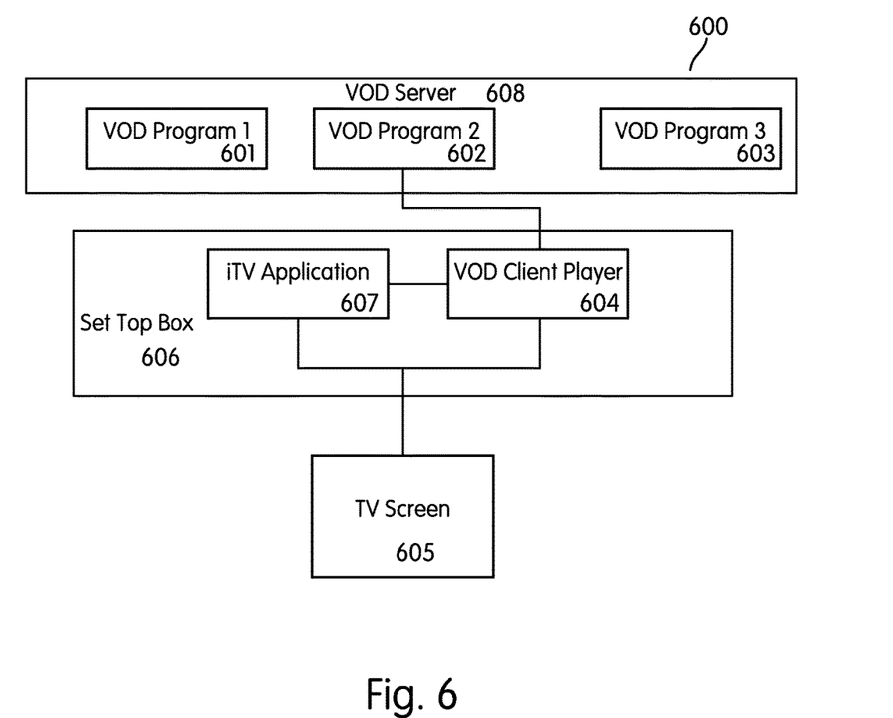
FIG. 6 illustrates a system for presenting a composite VOD clip sequence in accordance with alternative embodiments of the invention.

FIG. 6 illustrates a system for presenting a composite VOD in accordance with alternative embodiments of the invention. For one such embodiment, the iTV Application 607 sends back a list of VOD clip IDs to the VOD Server 608 whereupon the VOD Server 608 automatically concatenates the VOD clips in the desired sequence such that the iTV Application 607 can then present the resultant single video stream as if it were a single VOD program. Along with returning a handle/session to the composite stream, the VOD Server 608 will also pass back an update to the list metadata that includes indexes to the various VOD clips within the single VOD stream. Examples of such indexes include chapter marks and time codes. In this case all play, fast-forward, and fast-rewind controls would be handled by the VOD Server 608 as with any other single video asset; and jumping to next or previous clips is handled by the VOD Client Player 604, which will use the index information to send a request to the VOD Server 608 to reposition the current stream. This method will be subsequently referred to as Presentation Method 3.

Digital Video Recorder

One embodiment of the invention optionally also allows for the set of selected VOD clips to be recorded directly to a DVR for playback. In a STB with multiple tuners, this DVR recording can be made at the same time that the user is watching TV, by using the tuner not currently providing the video display for the user.

Thus, for one embodiment, the invention includes recording a set of VOD clips as a new program. Additionally, an embodiment of the invention allows for DVR content to be used as the basis for creating another new program. The user is allowed to select from some collection of DVR recorded programming, or segments within the DVR recordings, to create a brand new "program". The DVR clips that are made available for blending into new programming can be made available at the discretion of the iTV Applications being implemented. The DVR content consists of programs specifically recorded by the user and also programming that is pushed to the user's hard drive either via the system operator or via some third party service. One embodiment of the invention that allows for accessing DVR content is expressed by providing the user with a list of DVR recorded programs and by further allowing the user to select segments by start and stop time to be used as clips to create a new program.

Clip Metadata

Figure 7:
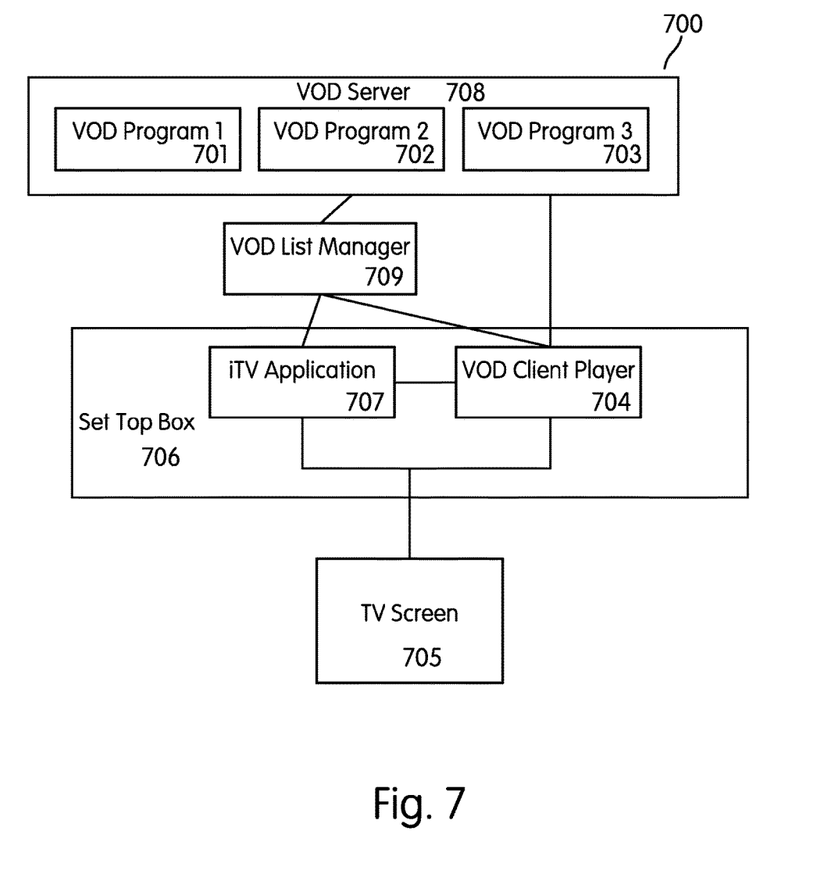
FIG. 7 illustrates a system employing a VOD list manager in accordance with one embodiment of the invention.

FIG. 7 illustrates a system implementing a VOD list manager in accordance with one embodiment of the invention. System 700, shown in FIG. 7, includes a VOD List Manager component 709, which will receive a presentation request (e.g., a play request) from the iTV Application 707. The VOD List Manager 709 is responsible for accepting the play request from the iTV Applications along with the list of selected VOD clips. The VOD List Manager 709 will then communicate with the VOD Server 708 (or some intermediary) to validate availability of the VOD clips, prepare a final list of VOD clips that will be included in the composite VOD presentation, and return that list to the iTV Application 707. The list of VOD clips returned to the iTV Application 707 may also contain the begin and end time (index) for each VOD clip segment where the VOD clips have been joined by the VOD Server 708 into a single stream as described above in reference to Presentation Method 3, or were originally part of a single asset as described above in reference to Presentation Method 2, or will contain the individual VOD asset IDs where the clips are still individual VOD assets as described above in reference to Presentation Method 1. In yet another embodiment, the returned list will also contain metadata about each clip. This metadata may include, but is not limited to, a URL (or some target designation), a flag to say whether fast-forward is allowed within the given clip, other metadata relative to the clip that an iTV Application 707 can act upon. The URL may be used to take the user to a specific destination if the user chooses to link out of the composite video program within a particular segment. The URL link can result in an event, some examples of which are tuning to a specific channel, launching another iTV Application, or launching another video. Additional details are provided in the advanced playback section below.

Automated Clip Insertion

Figure 8:
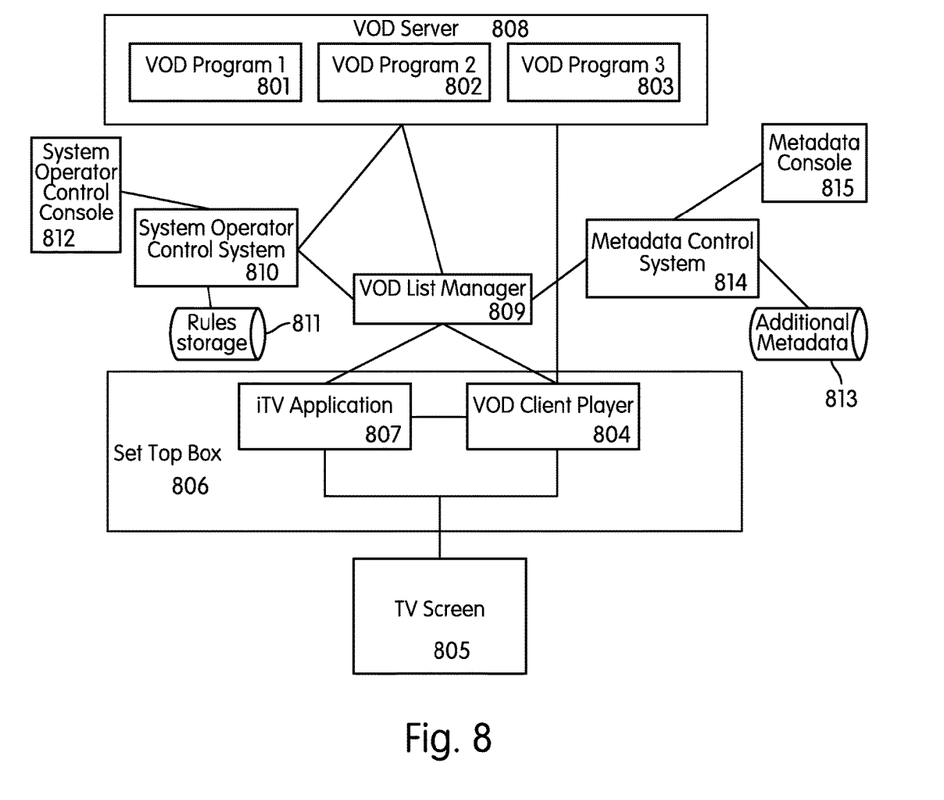
FIG. 8 illustrates a system implementing functionality to provide automatic insertion of VOD clips into a set of selected VOD clips in accordance with one embodiment of the invention.

FIG. 8 illustrates a system implementing functionality to provide automatic insertion of VOD clips into a set of selected VOD clips in accordance with one embodiment of the invention. System 800, shown in FIG. 8, includes a System Operator Control System 810 that allows for the entry of rules governing the automated insertion of clips into a set of selected VOD clips. Once the set of VOD clips is determined and validated by the VOD List Manager 809, the VOD List Manager 809 will then present its proposed list of VOD clips to the System Operator Control System 810, which will execute defined and stored rules that decide if VOD clips need to get inserted into the stream and further decide where such insertion will occur. Insertion can occur at any point in the stream, but by way of example, the System Operator Control System 810 has a rule such that whenever a specific VOD clip, or category of VOD clip, is played then a specially nominated VOD clip (or a selection from a specifically nominated set of VOD clips) will get inserted after or before a given VOD clip. Another example is that the System Operator Control System 810 inserts a VOD clip into the stream, if upon reading the metadata associated with the selected VOD clips, it finds a matching rule for VOD clip placement. The creation of various rules governing VOD clip insertion, given certain selections of VOD clips, results in zero or more VOD clips being inserted into the aggregate stream. The System Operator controlled rules governing automated clip insertion are entered through a System Operator Control Console 812 and are stored to, and retrieved from, a storage device as illustrated by Rules Storage 811.

In an embodiment of the invention where the VOD Server 808 unites the individual streams into a single asset reference, as described above in reference to Presentation Method 3, the VOD clip list is updated with the VOD clip insertions and the resulting updated VOD clip list is presented to the VOD Server 808. The final asset reference is returned to the iTV Application 807 along with the VOD clip list and metadata.

In an embodiment of the invention where the clips all belong to a single VOD file as described above in reference to Presentation Method 2, the rules that are input through the System Operator Control Console are constrained to only allow selection of automated VOD clip insertions from segments within a given VOD asset.

In an embodiment of this invention where the iTV Application 807 is responsible for starting and stopping the individual VOD streams to make the aggregate program, the VOD clip list is simply updated with asset IDs of the inserted VOD clips and then validated against the VOD clip availability on the VOD Server 808 by the VOD List Manager 809. The VOD clip list is then returned to the iTV Applications 807, which presents the streams based upon the order of the VOD clip list.

Advanced Playback (Using Metadata)

Figure 9:
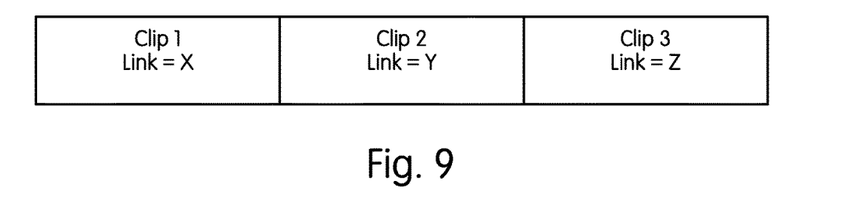
FIG. 9 illustrates a composite program of VOD clip segments in accordance with one embodiment of the invention.

As illustrated above in the three embodiments of simple playback, the iTV Application managing the playback of the video clips is given a list of VOD clips and associated metadata. In one embodiment of the invention, that metadata contains a link target such that the user can link out of a given VOD clip. This is illustrated in FIG. 9 which is a composite program consisting of three VOD clip segments, namely clip 1, clip 2 and clip 3. During playback of the composite program, the iTV Application provides a predetermined remote key or on-screen button that allows the user to link to a new location or begin a new event. In one embodiment of the invention, the iTV Application 507 provides a predefined remote key, or on screen button, to allow the user to jump to the next or previous VOD clip. This is accomplished by the iTV Applications making use of the VOD clip list that contains the details of clip handling such as start time of VOD clips and/or time code, or chapter locations of VOD clips.

In one embodiment of the invention, the iTV Application knows the start and stop of each clip because the VOD Client Player 504 is handing the videos to the iTV Applications, one by one, as described above in reference to Presentation Method 1. In an alternative embodiment of the invention, the iTV Application knows what VOD clip the user is watching because the iTV Application has a list of video segments/indexes with start and stop time codes, or chapter locations as described above in reference to Presentation Method 2. In another alternative embodiment of the invention, the iTV Application knows what VOD clip the user is watching because the VOD List Manager 809 has passed back a list of VOD clips along with a single video stream ID and the start and stop time marks within the new single aggregate stream as described above in reference to Presentation Method 3.

Given that the iTV Application knows what VOD clip is playing at any given time (using the data points about what VOD clips start at what time and using STB queries to get current play time in a given stream), the iTV Application can link to the target URL, or otherwise act on metadata, specified in the metadata for a given VOD clip. In the example illustrated by FIG. 9, when the user elects to jump out of the aggregate stream from within VOD clip 2 they will be taken to target "Y"; where Y may be another video or Y may be another application. An example of this is where the VOD clip 2 is an advertisement clip and the target Y is a new iTV Application describing offerings from that advertiser. Another example is where VOD clip 1 is a football highlight clip and the target X is the longer video version of that VOD clip highlight. The metadata that is passed back to the iTV Application can be any set of data that the application developer wished to have to act upon by the iTV Application. Another example is metadata stating that the current VOD clip should not support fast-forward. In this example, the iTV Applications would interrogate this metadata file before acting on any fast-forward request within the given VOD clip. This is valuable where some advertising may be inserted within a set of VOD clips and the system operator wishes to disable fast-forward for the advertisement VOD clips.

Referring again to FIG. 8, additional metadata about VOD clips may be added to the system by using the optional metadata enhancement components 813, 814, and 815. For example, Metadata Console 815 allows for the input of metadata and rules about implementation of metadata and will store additional metadata in Additional Metadata Store 813. This accommodation for metadata is for the storage of metadata relative to specific VOD assets or classes of VOD assets that are not typically carried in the standard VOD asset metadata definition such as is given by CableLabs ADI Specification 1.1 or Cable Video-on-Demand Content Specification 1.1. One example of such metadata for a class of VOD clip is to add a metadata rule for all VOD clips where the standard VOD metadata definition presented by the VOD Server gives a sub category of "Advertisement" such that additional metadata will be added to "disable fast-forward". An example for additional metadata for a single VOD clip is for an application-specific behavior where the rule is that given iTV Application ID is X and VOD Asset ID for the selected clip is Y, then insert metadata Z for URL link for clip Y. Thus, the Metadata control system allows for the input of additional metadata and for the input of rules about how that metadata is applied. The VOD List Manager 809 then makes that metadata information available to the iTV Application 807.

General Matters

Embodiments of the invention provide systems and methods for selecting a number of VOD clips and presenting the selected VOD clips as a composite VOD clip sequence without further user interaction. Although embodiments of the invention have been described in the context of a digital television system, alternative embodiments may be used in other systems. For example, an embodiment of the invention may be utilized over a satellite TV system where some technology, such as broadband, is used to deliver On Demand or pre-cached programs. Another example of a non-cable system to which an embodiment of the invention is applicable, is a gaming device (e.g., XBOX, PlayStation, GameCube, PC, etc.) attached to a television or monitor where said device has a broadband connection with the ability to deliver On Demand and/or pre-cached programs.

The invention has many applications. Some applications, by way of example only, include but are not limited to (i) creating a sequence of sports (or other category) highlight clips to subsequently watch as a stream of favorite sports (or other category) clips; (ii) creating a pre-selected path of video clips through a story line to watch a personalized story; (iii) creating a personalized video program by selecting individual clips from a single event or by mixing clips from multiple events; and (iv) creating a personalized news cast or news magazine video program.

Embodiments of the invention include various operations. Many of the methods are described in their most basic form, but operations can be added to or deleted from any of the methods without departing from the basic scope of the invention.

It will be apparent to those skilled in the art that the operations of embodiments of the invention may be stored upon or embodied in machine-executable instructions, which may be used to cause a general-purpose or special-purpose processor or logic circuits programmed with the instructions to perform specific operations.

Alternatively, the operations of embodiments of the invention may be performed by a combination of hardware and software. Embodiments of the invention present may be provided as a computer program product that may include a machine-readable medium having stored thereon instructions, which may be used to program a computer (or other electronic devices) to perform a process according to various embodiments of the invention.

Such machine-readable medium may include, but are not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote processor to a requesting processor by way of data signals embodied in a carrier wave or other propagation medium via a communication cell (e.g., a modem or network connection). The present invention also relates to an apparatus for performing the operations herein. This apparatus may be specially constructed for the required purposes, or it may comprise a general-purpose processing system selectively activated or reconfigured by an application program stored within the processing system. Such an application program may be stored in a machine-readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus.

The processes described herein are not inherently related to any particular system or other apparatus. Various general-purpose systems may be used with programs in accordance with the teachings herein, or it may prove convenient to construct a more specialized apparatus to perform the described operations.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
a video-content server;
a client device, comprising first non-transitory computer-readable media storing computer-readable instructions that, when executed by a first processor, cause the client device to:
request two or more video-content clips from video content associated with a single event;
receive the two or more video-content clips as a single video stream for playback that comprises indices comprising start and stop time codes for each of the two or more video-content clips; and
automatically jump during playback to an indexed start time code of a next video clip in the single video stream; and
a system-control device disposed between the video-content server and the client device, comprising second non-transitory computer-readable media storing computer-readable instructions that, when executed by a second processor, cause the system-control device to:
link one of the two or more video-content clips to a target uniform resource locator (URL) linking to supplemental information associated with the one of the two or more video-content clips; and
execute defined and stored rules that decide if video-content clips need to be inserted into a stream and, if so, where in the stream the insertion will occur,
wherein the defined and stored rules constrain selection of the video-content clips to be inserted into the stream to segments from within a single video-content asset.

2. A method comprising:
parsing, by a computing device, a video associated with a single event based on a plurality of automated rules;
creating a list of sports-highlight video clips from the parsed video associated with the single event;
transmitting the list of sports-highlight video clips to a client device at a different geographic location than the computing device;
receiving a request for a plurality of sports-highlight video clips selected from the list of sports-highlight video clips, the request comprising a plurality of identifiers each associated with one of the plurality of the sports-highlight video clips and user input from a user, the user input selecting a user-defined sequencing order of the plurality of sports-highlight video clips, wherein the user-defined sequencing order of the plurality of sports-highlight video clips results from the user traversing a decision tree having a plurality of decision nodes structured so that selecting a sports-highlight video clip at each node constrains selection of sports-highlight video clips at a subsequent node;
determining a plurality of advertisement video clips to be inserted;
concatenating the plurality of advertisement video clips and the plurality of sports-highlight video clips into a single video file in accordance with the user-defined sequencing order, wherein the plurality of advertisement video clips is included in the single video file in accordance with a plurality of rules indicating whether to insert one of the plurality of advertisement video clips before or after one of the plurality of the sports-highlight video clips;
associating at least one of the concatenated video clips with a uniform resource locator (URL) that links to supplemental information associated with the single event or one of the plurality of advertisement video clips;

transmitting the concatenated video clips to a digital video recorder (DVR) that stores the concatenated video clips as the single video file;

transmitting metadata comprising:
 the plurality of identifiers each associated with one of the concatenated video clips,
 a plurality of indices indicating start and stop time codes for each of the concatenated video clips, and whether fast forwarding is permitted during presentation of each of the concatenated video clips; and receiving, in response to the DVR playing back the single video file, an identifier of a currently-playing clip that identifies which of the concatenated video clips is currently playing on the DVR.

3. The method of claim 2, wherein the DVR receives the single video file using a tuner not currently providing a video display for the user.

\* \* \* \* \*

UNITED STATES PATENT AND TRADEMARK OFFICE
CERTIFICATE OF CORRECTION

| | |
|---|---|
| PATENT NO. | : 9,615,061 B2 |
| APPLICATION NO. | : 10/727793 |
| DATED | : April 4, 2017 |
| INVENTOR(S) | : Carney et al. |

It is certified that error appears in the above-identified patent and that said Letters Patent is hereby corrected as shown below:

In the Drawings

Sheet 5 of 8, Fig. 5:
Please insert --500-- above "508"

Sheet 8 of 8, Fig 8:
Insert --800-- above "808"

In the Specification

Column 5, Detailed Description, Line 27:
Delete "507," and insert --506,--

Signed and Sealed this
Eleventh Day of April, 2023

Katherine Kelly Vidal
*Director of the United States Patent and Trademark Office*